US006173250B1

(12) United States Patent
Jong (10) Patent No.: US 6,173,250 B1
(45) Date of Patent: Jan. 9, 2001

(54) APPARATUS AND METHOD FOR SPEECH-TEXT-TRANSMIT COMMUNICATION OVER DATA NETWORKS

(75) Inventor: Kenneth Jong, Bridgewater, NJ (US)

(73) Assignee: AT&T Corporation, New York, NY (US)

( * ) Notice: Under 35 U.S.C. 154(b), the term of this patent shall be extended for 0 days.

(21) Appl. No.: 09/089,855

(22) Filed: Jun. 3, 1998

(51) Int. Cl.⁷ .............................. G10L 13/00; G06F 17/28
(52) U.S. Cl. .................. 704/3; 704/269; 379/88.06; 379/88.16
(58) Field of Search ...................... 704/201, 221, 704/235, 260, 270, 500, 501, 249, 258, 272, 2, 3, 4; 379/88.05, 88.06, 88.16, 88.18

(56) References Cited

U.S. PATENT DOCUMENTS

| 4,641,264 | | 2/1987 | Nitta et al. ............................. 704/4 |
| 4,706,212 | | 11/1987 | Toma ...................................... 704/2 |
| 4,980,829 | | 12/1990 | Okajima et al. ........................ 704/5 |
| 5,029,200 | * | 7/1991 | Haas et al. ........................ 379/88.18 |
| 5,293,584 | | 3/1994 | Brown et al. ....................... 704/277 |
| 5,384,701 | | 1/1995 | Stentiford et al. ..................... 704/3 |
| 5,426,583 | | 6/1995 | Uribe-Echebarria Diaz ........... 704/2 |
| 5,477,450 | | 12/1995 | Takeda et al. .......................... 704/2 |
| 5,497,319 | | 3/1996 | Chong et al. .......................... 704/2 |
| 5,510,981 | | 4/1996 | Berger et al. .......................... 704/2 |
| 5,640,575 | | 6/1997 | Maruyama et al. .................... 704/4 |
| 5,675,815 | | 10/1997 | Yamauchi et al. ................... 707/530 |
| 5,677,835 | | 10/1997 | Carbonell et al. ..................... 704/8 |
| 5,687,383 | | 11/1997 | Nakayama et al. .................... 704/2 |
| 5,696,879 | * | 12/1997 | Cline et al. ......................... 704/260 |
| 5,696,980 | | 12/1997 | Brew .................................. 704/273 |
| 5,712,901 | | 1/1998 | Meermans ........................ 379/88.14 |
| 5,724,410 | * | 3/1998 | Parvulescu et al. ................. 704/258 |
| 5,857,170 | * | 1/1999 | Kondo ................................ 704/266 |
| 5,875,422 | * | 2/1999 | Eslambolchi et al. ................. 704/3 |
| 5,884,262 | * | 3/1999 | Wise et al. .......................... 704/270 |
| 5,911,129 | * | 6/1999 | Towell ................................ 704/272 |
| 5,915,237 | * | 6/1999 | Boss et al. .......................... 704/258 |
| 5,915,238 | * | 6/1999 | Tjaden ................................ 704/260 |
| 5,933,805 | * | 8/1999 | Boss et al. .......................... 704/249 |
| 5,940,796 | * | 8/1999 | Matsumoto ......................... 704/260 |
| 5,949,854 | * | 9/1999 | Sato ................................ 379/88.16 |
| 6,014,428 | * | 1/2000 | Wolf ................................ 379/88.11 |
| 6,073,094 | * | 6/2000 | Chang et al. ........................ 704/223 |

OTHER PUBLICATIONS

Magedi et al., "Proposals of MIDI coding and its application for audio authoring," IEEE International Conference on Multimedia Computing and Systems, pp. 305–314, Jul. 1998.*

* cited by examiner

Primary Examiner—David R. Hudspeth
Assistant Examiner—Martin Lerner
(74) Attorney, Agent, or Firm—Oliff & Berridge, PLC (57) ABSTRACT

An apparatus and method for speech-text-transmit communication over data networks includes speech recognition devices and text to speech conversion devices that translate speech signals input to the terminal into text and text data received from a data network into speech output signals. The speech input signals are translated into text based on phonemes obtained from a spectral analysis of the speech input signals. The text data is transmitted to a receiving party over the data network as a plurality of text data packets such that a continuous stream of text data is obtained. The receiving party's terminal receives the text data and may immediately display the text data and/or translate it into speech output signals using the text to speech conversion device. The text to speech conversion device uses speech pattern data stored in a speech pattern database for synthesizing a human voice for playing of the speech output signals using a speech output device.

20 Claims, 7 Drawing Sheets

APPARATUS AND METHOD FOR SPEECH-TEXT-TRANSMIT COMMUNICATION OVER DATA NETWORKS

BACKGROUND OF THE INVENTION

1. Field of Invention

The invention pertains to an apparatus and method for providing real time communication over a data network.

2. Description of Related Art

With the ever increasing benefits of computerization to every day life, more people are logging-on to the Internet to obtain information and to communicate with other people around the world. This communication typically takes the form of textual messages sent either by electronic mail, text messages sent to other users currently logged-on to designated "chat rooms" or sent through Internet messaging. These text messages must be manually input via a computer keyboard and sent to the other users as blocks of text. This causes a great delay in the transmission and reception of messages since the speed at which communication takes place is dependent on the users' typing ability.

Recently, voice telephony systems have been devised which use voice codes (coder/decoders) to achieve actual voice communication over data networks. These systems take voice input signals, digitize these signals, and encode them for transmission as digital data. This data is transmitted to a receiving station where the coded data is decoded and output to the receiving party. These systems are straddled with significant sound degradation (delays and distortions) due to the asynchronous nature of the data network and the continuous streaming of the data packets necessary for the transmission of actual voice data. The timing of the data packets used in such voice telephony systems requires large bandwidth and cannot tolerate undesirable delays. Therefore, the use of standard modem lines having small bandwidths in voice telephony systems results in degradation of the reconstructed sound.

Furthermore, these voice telephony systems do not allow for anonymity of the parties since the party's actual voice is transmitted. Such anonymity is generally valued by users of the Internet because it provides a sense of privacy and security. In addition, automatic documentation of conversations are not possible and the voice telephony is limited to the particular languages spoken by the parties. Thus, new technology is needed to achieve acceptable voice communication over data networks.

SUMMARY OF THE INVENTION

The present invention is directed to an apparatus and method for providing speech-text-transmit communication over data networks. With the present invention, speech input signals are converted into text data through the use of speech recognition and transmitted over a data network to a designated receiving party. The text data may be converted back into speech output signals at the receiving party's terminal. The speech output signals are obtained using a synthesized speech pattern.

Since text data packets representing speech are streaming at a lower data rate when compared with voice telephony data packets, the transmission of the text data packets may be performed at a lower speed and therefore a lower bandwidth. Thus, a realtime continuous text stream and synthesized speech output may be realized using a lower data rate in data networks. In addition, the text data may be displayed to the receiving party or stored in a storage device for later review and reproduction. In this way, the communication may be documented.

Further, the speech pattern data of synthesized speech used to output the converted text data may be designated by the sending and/or receiving parties. In this way, the system is tailorable to the particular preferences of the parties involved in the communication.

Further, the present invention provides an apparatus for translating the text data received in one language into text data of another language. In this way, communication may be facilitated in the parties' own languages thereby reducing the chances of misinterpretation.

BRIEF DESCRIPTION OF THE DRAWINGS

The preferred embodiments of this invention are described in detail with reference to the following figures, wherein like numerals represent like elements, and wherein.

DETAILED DESCRIPTION OF PREFERRED EMBODIMENTS

Figure 1:
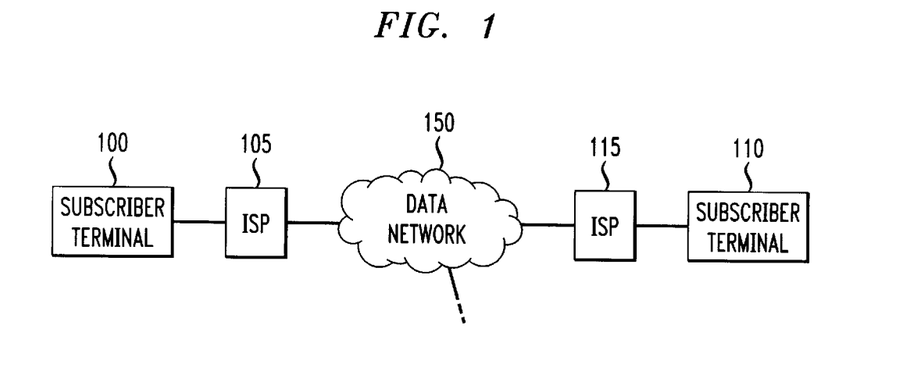
FIG. 1 is a block diagram of a speech-text-transmit system.

FIG. 1 is a block diagram of an exemplary embodiment of a speech-text-transmit (STT) system. The STT system includes a subscriber terminal 100 and a subscriber terminal 110 in connection with a data network 150 through Internet Service Providers (ISPs) 105 and 115, for example.

The data network 150 may be any type of data network used for communication and data transfer. Examples include the Internet, local area networks (LANs), wide area networks (WANs), and the like. For purposes of explanation of the present invention, the data network 150 is considered to be the Internet.

The subscriber terminals 100 and 110 may be personal computers connected to the data network 150 via modem connections, computer terminals connected via a LAN or WAN, WebTV™ devices, telephones (wired or wireless) connected to computing gateways with access to the Internet, and the like. For purposes of explanation of the present invention, subscriber terminals 100 and 110 are considered to be personal computers connected to the data network via modem connections.

With the present invention, when subscriber terminal 100 wishes to communicate with subscriber terminal 110, assuming both subscriber terminals are logged onto the data network 150 through their respective ISPs 105 and 115, the subscriber terminal 100 designates subscriber terminal 110 as the recipient of further communications. The subscriber terminal 100 may then initiate communication with subscriber terminal 110 via the data network 150 by receiving audio input signals from the user and converting them into textual representations of the audio input signals. These textual representations are then sent to the subscriber terminal 110 via the data network 150. Subscriber terminal 110 may then respond in kind. In this way, realtime communication is achieved by the sending of continuous streams of text data over the data network 150 to and from the subscriber terminals.

Figure 2:
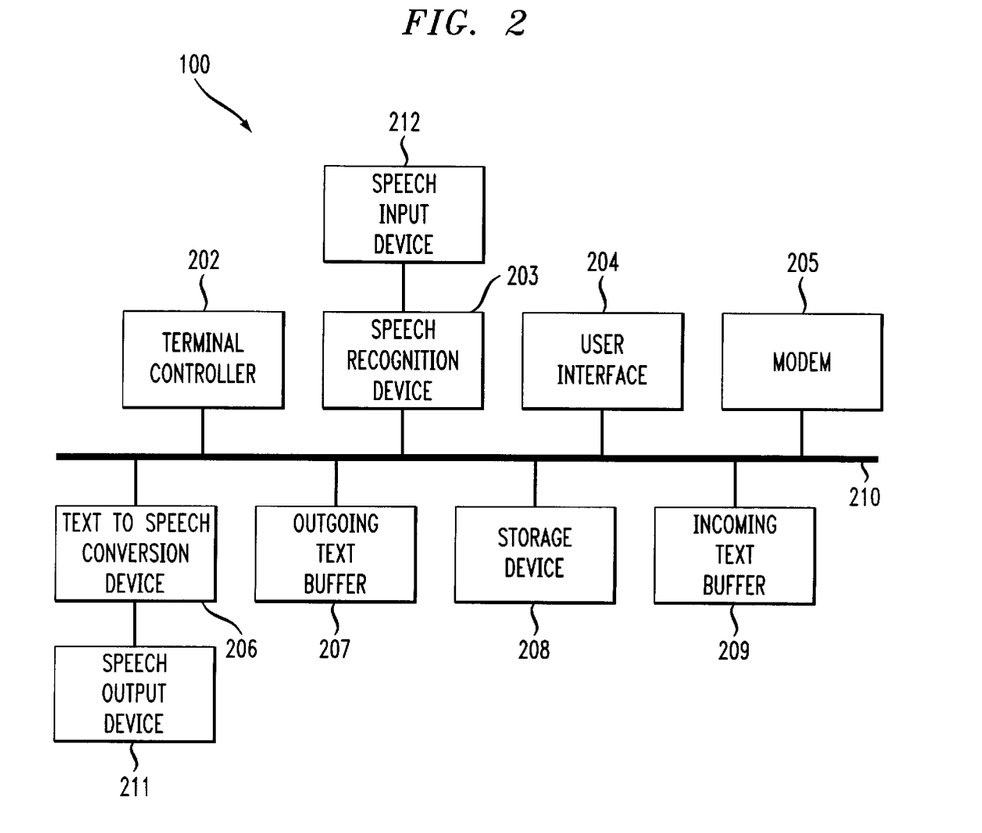
FIG. 2 is a block diagram of the subscriber terminal of FIG. 1.

FIG. 2 is a block diagram of subscriber terminal 100. The subscriber terminal 110 is similarly equipped. As shown in FIG. 2, the subscriber terminal 100 includes a terminal controller 202, a speech recognition device 203, a user interface 204, a modem 205, a text to speech conversion device 206, an outgoing text buffer 207, a storage device 208 and an incoming text buffer 209. These devices are connected to one another by way of bus 210. The terminal controller 202 controls the flow of information along the bus 210 to each of the devices.

A speech input device 212 is connected to the terminal 100 through the speech recognition device 203. The speech input device 212 includes, for example, a microphone, telephone handset, telephone headset, and the like. The speech input device 212 detects a user's speech and converts it into speech signals that are sent to the speech recognition device 203.

A speech output device 211 is connected to terminal 100 through the text to speech conversion device 206. The speech output device 211 includes, for example, speakers, amplifiers, and the like for providing audible output signals. Speech signals sent from the text to speech conversion device 206 are output by the speech output device 211.

The user interface 204 includes, for example, a keyboard, a display, a pointing device, and the like. The user interface 204 handles user requests by receiving, for example, keyboard entries combined with the actions of a pointing device, such as a computer mouse or trackball, to establish and modify the communications process.

The modem 205 includes any type network interface that facilitates the transmission and reception of data from the terminal 100 to the data network 150 and vice versa. This includes both external and internal modem devices of various baud rates. The modem 205, in a preferred embodiment, is intended to be of the generally available type that can be purchased in most retail electronics stores. However, specialized modems are also intended to be within the spirit and scope of this invention. In alternative embodiments, the modem may be replaced by, for example, a local area network card, and the like, that allows the terminal to interact as part of a computer network. Any such device that allows for the communication between two or more terminals is intended to be represented by the modem 205.

The storage device 208 may be any type of storage device that provides for the storage of electronic data. For example, the storage device 208 may be a hard disk, floppy disk, magnetic tape, writeable CD, zip disk, and the like. The storage device 208 provides storage for data and, in particular, provides storage for documenting communications using the present invention.

The outgoing and incoming text buffers 207 and 209 may be any type of memory device used for the temporary storage of information. The text buffers 207 and 209 may be a RAM, hard disk, floppy disk, magnetic tape, cache and the like. The text buffers 207 and 209 serve to provide a temporary storage of text data received and to be transmitted over the data network 150 via modem 205. In this way, a continuous stream of text data may be received from and transmitted to the receiving party (either subscriber terminal 100 or 110).

The terminal controller 202 provides the controlling activities to set up communications protocols which, for example, include Internet Protocol (IP) addresses of communications parties and the Universal Resource Locator (URL) address of the hosting site, to initiate the communications process. When transmitting text data, the terminal controller 202 coordinates the timing sequence and signal flow from the speech input at the speech input device 212, through the speech recognition device 203, the outgoing text buffer 207, the storage device 208 if needed, and the modem 205, to output a text stream to the Internet. When receiving text data, the terminal controller 202 coordinates the timing sequence and signal flow from the modem 205, through the incoming text buffer 209, the text to speech conversion device 206 and the speech output device 211.

The subscriber terminals 100 and 110 are connected to the data network 150 via their modems 205 through Internet Service Providers (ISPs) 105 and 115, respectively. The subscriber terminals 100 and 110 log onto the data network 150 by establishing modem connections to their respective ISPs 105 and 115 and enabling browsing software such as Netscape™ or Microsoft Internet Explorer™ (generally supplied by the particular ISP or obtainable through third parties). When logging onto the ISPs 105 and 115, the subscriber terminals 100 and 110 are assigned Internet Protocol (IP) addresses within the data network 150. Communication with other subscribers through the data network 150 is performed using these IP addresses and may include a host, as is well known in the art.

One type of communication generally used by the subscriber terminals 100 and 110 is chat. In this type of communication, the subscriber terminals 100 and 110 log onto their respective ISPs 105 and 115, enable their browser software and enter designated chat sites by either locating them using search engines or entering the site's URL. In these chat sites, the subscriber terminals 100 and 110 are provided with a list of other chat participants currently logged onto that chat site. The operators of the subscriber terminals 100 and 110 may type messages to all of the other chat participants or may designate certain ones of the chat participants with which to communicate.

In one embodiment, the subscriber terminals 100 and 110 are assumed to be logged onto a same chat site. In this chat site, the subscriber terminal 100 designates subscriber terminal 110 as the party with whom speech communication is desired. Once the subscriber terminal 110 is designated, the operator of the subscriber terminal 100 initiates communication with the operator of the subscriber terminal 110 by speaking into the speech input device 212. The speech input is translated into speech signals by the speech input device 212. The speech signals are then input to the speech recognition device 203 where they are converted into text data. This text data is then sent to the output text buffer 207 via bus 210. The terminal controller 202 causes the outgoing text buffer 207 to be continuously emptied by transmitting the text data stored in the outgoing text buffer 207 to the IP address of the subscriber terminal 110 via the modem 205, ISP 105, data network 150 and ISP 115.

The text data arriving at modem 205 of the subscriber terminal 110 is first stored temporarily in inpcoming text buffer 209. From the incoming text buffer 209, the text data can be displayed immediately or may be forwarded to the text to speech conversion device 206 of subscriber terminal 110 where the text data is converted into synthesized speech output signals using stored speech pattern data as will be described below. The operator of the subscriber terminal 110 may reply in the same manner, thereby enabling real time speech communication using text data transmission over the data network 150.

Figure 3:
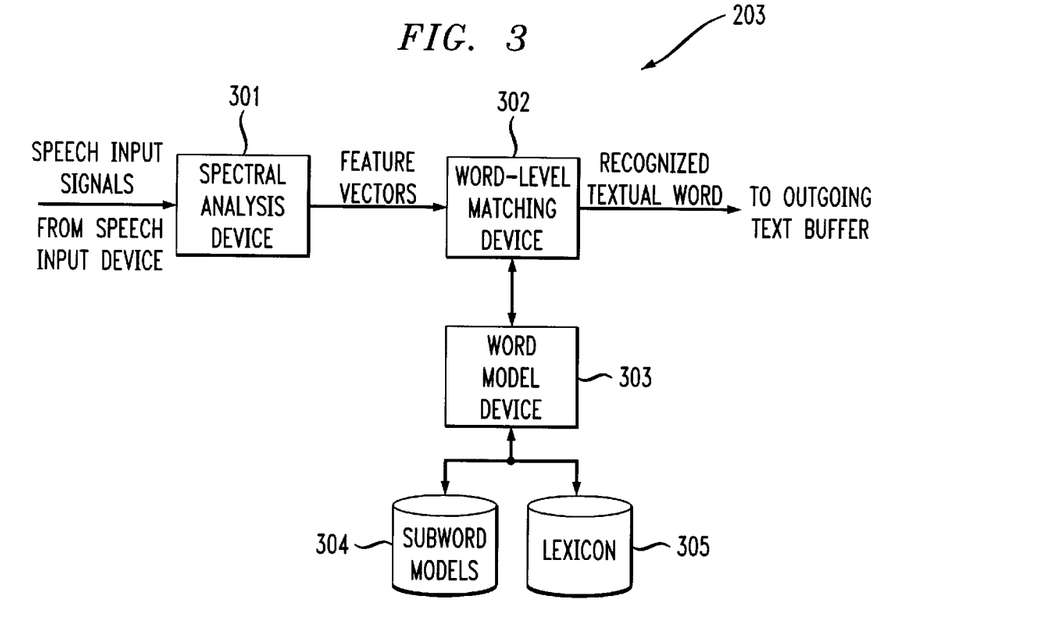
FIG. 3 is a block diagram of the speech recognition device of FIG. 2.

FIG. 3 is a detailed block diagram of an exemplary speech recognition device 203 of FIG. 2. As shown in FIG. 3, the speech recognition device 203 includes a spectral analysis device 301, a word-level matching device 302, a word model device 303, a subword models database 304, and a lexicon database 305.

When the speech input signals are received by the speech recognition device 203, the spectral analysis device 301 receives the speech input signals and extracts feature vectors from them. The feature vectors are input to a word-level matching device 302 which compares the feature vectors against the word models retrieved by the word model device 303 to identify the words that make up the speech input signals.

The word model device 303 retrieves information from the subword model and lexicon databases 304 and 305. The word model device 303 includes a listing of phonemes (speech sounds) which are used to identify the words in the speech input signals. The subword model database 304 contains word syllables that are correlated with the phonemes of the word model device 303. The lexicon database 305 stores a dictionary of recognizable words.

The word model device 303 identifies the phonemes in the speech input signals and extracts the corresponding syllables from the subword model database 304. The syllables are then checked against the lexicon data stored in the lexicon database 305. In this way, the syllables that make up the various words in the speech input signals are grouped into the recognizable words identified using the lexicon database 305. The identified words are sent to the outgoing text buffer 207. In this way a continuous stream of text data is sent to the outgoing text buffer 207 and, in turn, is output to the modem 205 and transmitted to the receiving party via the data network 150.

Figure 4:
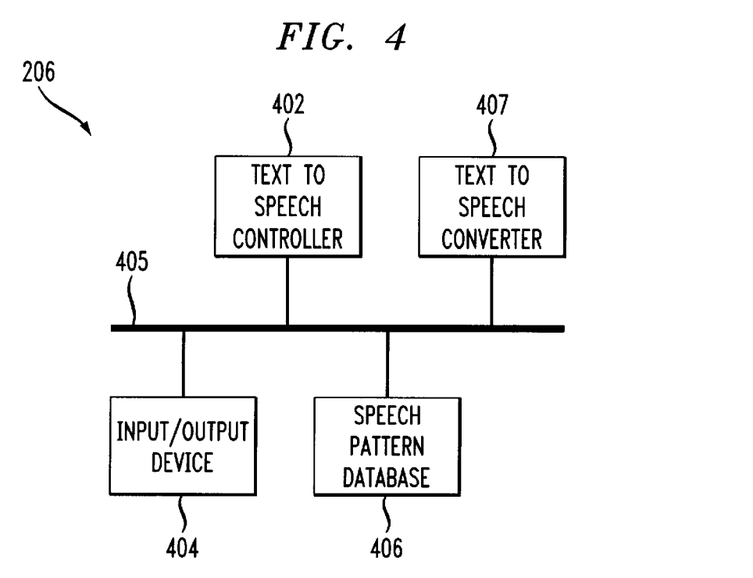
FIG. 4 is a block diagram of the text to speech conversion device of FIG. 3.

FIG. 4 is a block diagram of the text to speech conversion device 206 of FIG. 2. When text data is received through the modem 205, it is temporarily stored in the incoming text buffer 209. The terminal controller 202 then causes the stored text data to be routed to the text to speech conversion device 206. The text to speech controller 402 receives the text data through the input/output device 404 and routes the text data to the text to speech converter 407. The text to speech converter 407 converts the text data into speech output signals using synthesized speech pattern data stored in speech pattern database 406. Such translation of text into audio signals using synthesized speech pattern data is generally known in the art and the description is therefore omitted. These speech output signals are then output to the receiving party through the speech output device 211.

The speech pattern database 406 contains a plurality of speech patterns that may be used to provide a synthesized speech output of the text data. These speech patterns may have various characteristics representing different types of persons. For example, one speech pattern may represent an adult male and another may represent an adult female. Alternatively, a speech pattern of the party actually sending the text data may be stored in the speech pattern database 406 in order to obtain a synthesized speech output simulating the sending party's actual voice.

Another feature of the invention is the ability to document the communications being transmitted to and from the parties involved in the communication. To enable this feature, the operator of the subscriber terminal 100 or 110 inputs a command through the user interface 204 to enable documenting of communications. When this feature is enabled, all text data that is either received or sent is also stored in the storage device 208 as a text data file. Thus, when the terminal controller 202 determines that text data is being received, a copy of the text data is stored in the storage device 208. Likewise, when the terminal controller determines that text data is to be transmitted from the outgoing text buffer 207, a copy of the text data is also stored in the storage device 208. Depending on the source of the text data, the terminal controller 202 may also cause identifying text to be added that identifies the source of the text data. For example, in a communication between Steve and John, the terminal controller 202 will add the name "Steve" before all text being transmitted from the outgoing text buffer 207 and the name "John" before all text data being received from the modem 205. In this way, the operator, "Steve", may retain a transcript of the communication for later reference.

The received text data may be displayed immediately to the operator and not translated to speech output signals at all. In this way, one party may communicate in text only mode while the other party may communicate using speech.

Using the above described speech-text-transmit system, realtime continuous communication over the data network 150 is realized using existing modem lines. Since text data does not require as high a data rate as voice telephony data packets, the speed at which the data must be sent is reduced, thereby allowing for conventional modem lines to transmit the data without degradation. Additionally, since the audio output is of a synthesized speech, anonymity may also be preserved.

FIGS. 5 to 8 are flowcharts of the process described above. This process is from the viewpoint of only one subscriber terminal 100 or 110. However, the same operations are performed by both subscriber terminals 100 and 110. Also, while the flowchart assumes, for simplicity, that either text data is being received or speech data is being input, it is recognized that text data may be received and speech data may be input at the same time. Thus, translation from text to speech and from speech to text may be performed concurrently.

Figure 5:
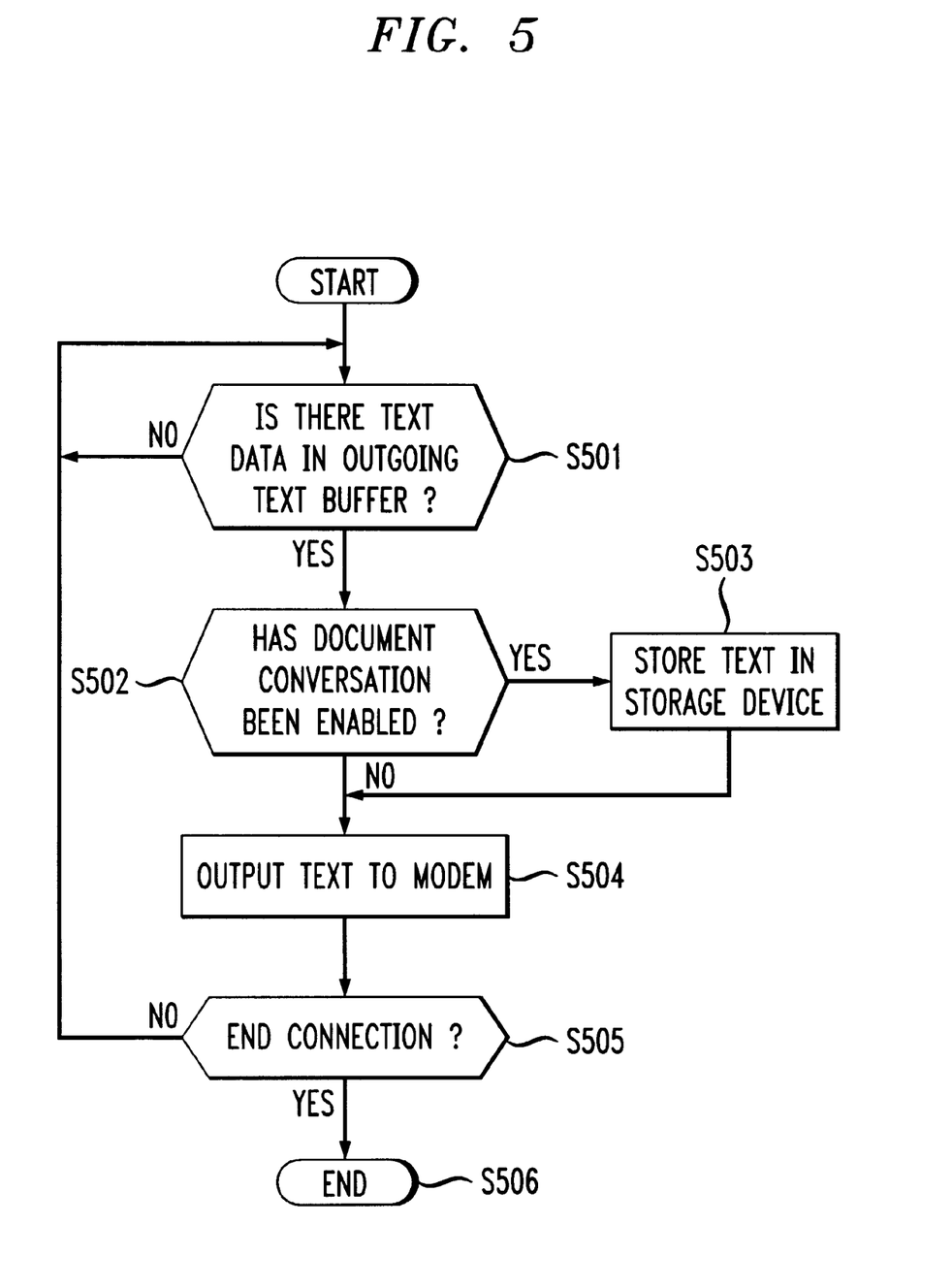
FIG. 5 is a flowchart of the operation of the terminal controller of FIG. 2 when monitoring the output text buffer for text data to be output via the modem.

FIG. 5 is a flowchart of the operation of the terminal controller 202 when transmitting text data. In step S501, the terminal controller 202 determines whether text data is to be transmitted by determining if there is text data present in the outgoing text buffer 207. If text data is present in the outgoing text buffer 207, the terminal controller 202 proceeds to step S502; otherwise the terminal controller 202 returns to step S501. In step S502, the terminal controller 202 determines whether the operator has indicated that the conversation should be documented. If the conversation is to be documented, the terminal controller 202 goes to step S503; otherwise the terminal controller 202 goes to step S504. In step S503, the terminal controller 202 stores a copy of the text data in the storage device 208 for later retrieval and goes to step S504.

In step S504, the terminal controller 202 outputs the text data from the outgoing text buffer 207 to the modem 205 and goes to step S505. The modem 205 transmits the text data to the receiving party 110 via the communications links to ISP 105, data network 150 and ISP 115. In step S505, the terminal controller 202 determines if an end condition has arisen. This end condition is, for example, the termination of the conversation and the like. If the end condition has occurred, the terminal controller 202 goes to step S506 and ends; otherwise, the terminal controller 202 returns to step S501.

Figure 6:
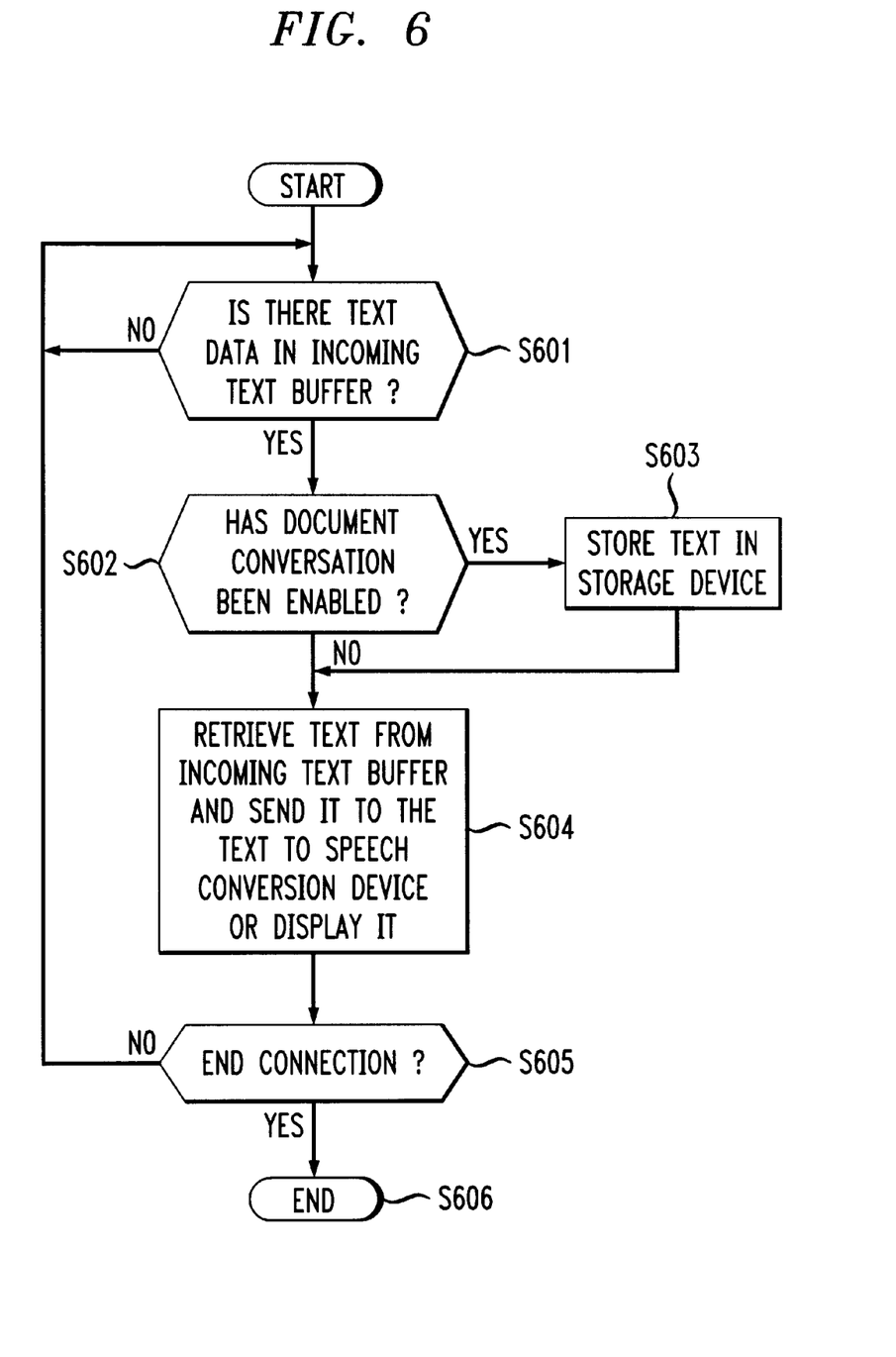
FIG. 6 is a flowchart of the operation of the terminal controller of FIG. 2 when monitoring the input text buffer for text data received through the modem.

FIG. 6 is a flowchart of the operation of the terminal controller 202 when text data is being received via the modem 205 and stored in input text buffer 209. In step S601, the terminal controller 202 determines if there is text data stored in the incoming text data buffer 209. If there is text data stored in the incoming text buffer 209, the terminal controller 202 goes to step S602; otherwise, the terminal controller 202 returns to step S601. In step S602, the terminal controller 202 determines whether the operator has designated that the conversation is to be documented. If the conversation is to be documented, the terminal controller 202 goes to step S603; otherwise, the terminal controller 202 goes to step S604. In step S603, the terminal controller 202 stores a copy of the text data received by the incoming text buffer 209 in the storage device 208 for later retrieval, and goes to step S604.

In step S604, the terminal controller 202 retrieves the text data from the input text buffer and either sends it to the text to speech conversion device 206 or simply displays the text, depending on the settings input by the operator. If the operator has chosen to only display the incoming text, the text data is displayed through the user interface 204. Otherwise, the text data is sent to the text to speech conversion device 206 for conversion into synthesized speech output signals.

Next, in step S605, the terminal controller 202 determines whether an end condition has occurred. This end condition may be, for example, the termination of the conversation and the like. If an end condition has occurred, the terminal controller 202 goes to step S606 and ends; otherwise, control returns to step S601.

Figure 7:
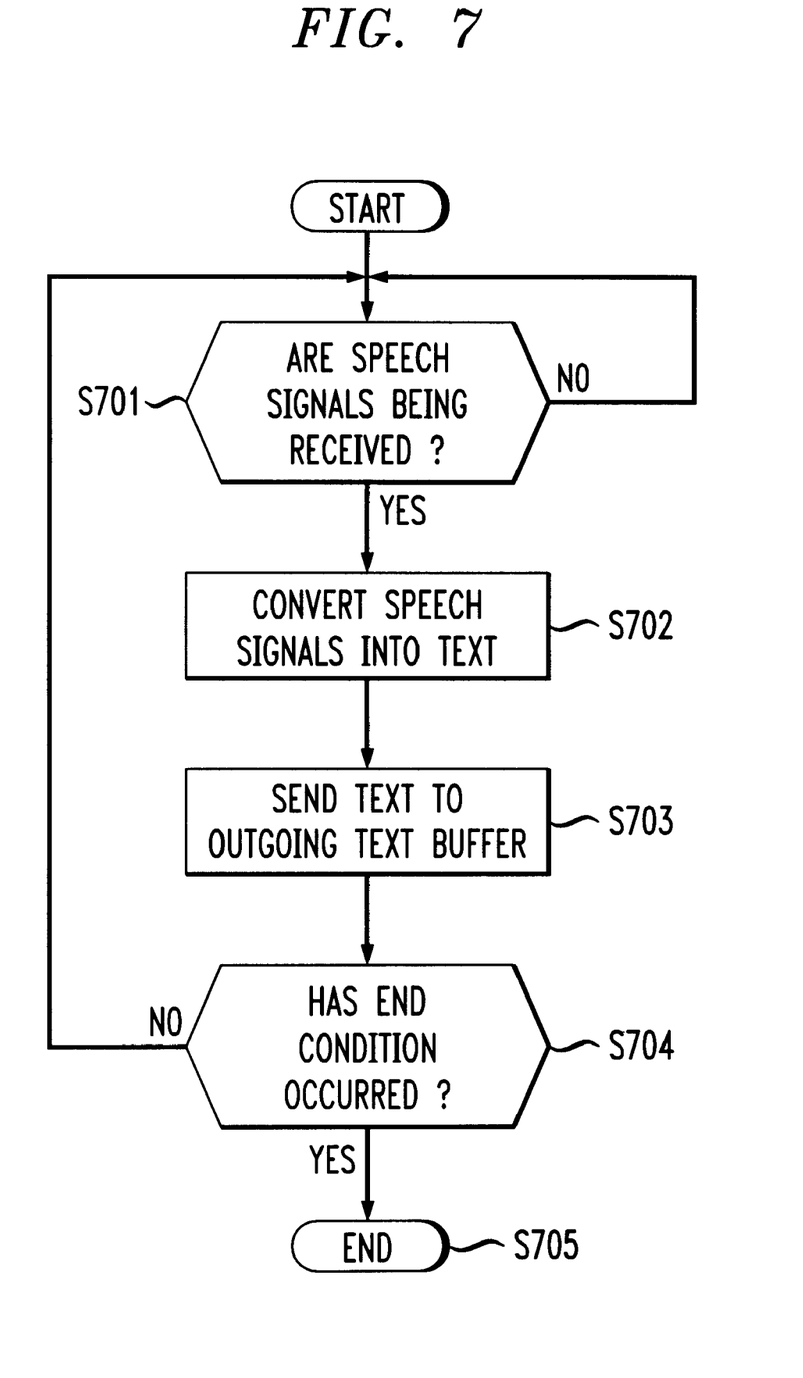
FIG. 7 is a flowchart of the operation of the speech recognition device of FIG. 3.

FIG. 7 is a flowchart showing the operation of the speech recognition device 203. In step S701, the speech recognition device 203 determines if speech signals are being received via the speech input device 212. If speech signals are being received, control continues to step S702; otherwise, control returns to step S701 until speech signals are detected.

In step S702, the speech recognition device 203 converts the speech signals that are being received into text data as described above. Control then continues to step S703 where the speech recognition device 203 outputs the text data to the outgoing text buffer 207. Next, in step S704, the speech recognition device 203 determines if an end condition has occurred. The end condition may be, for example, the termination of the conversation and the like. If an end condition has occurred, control goes to step S705 and ends; otherwise, control returns to step S701.

Figure 8:
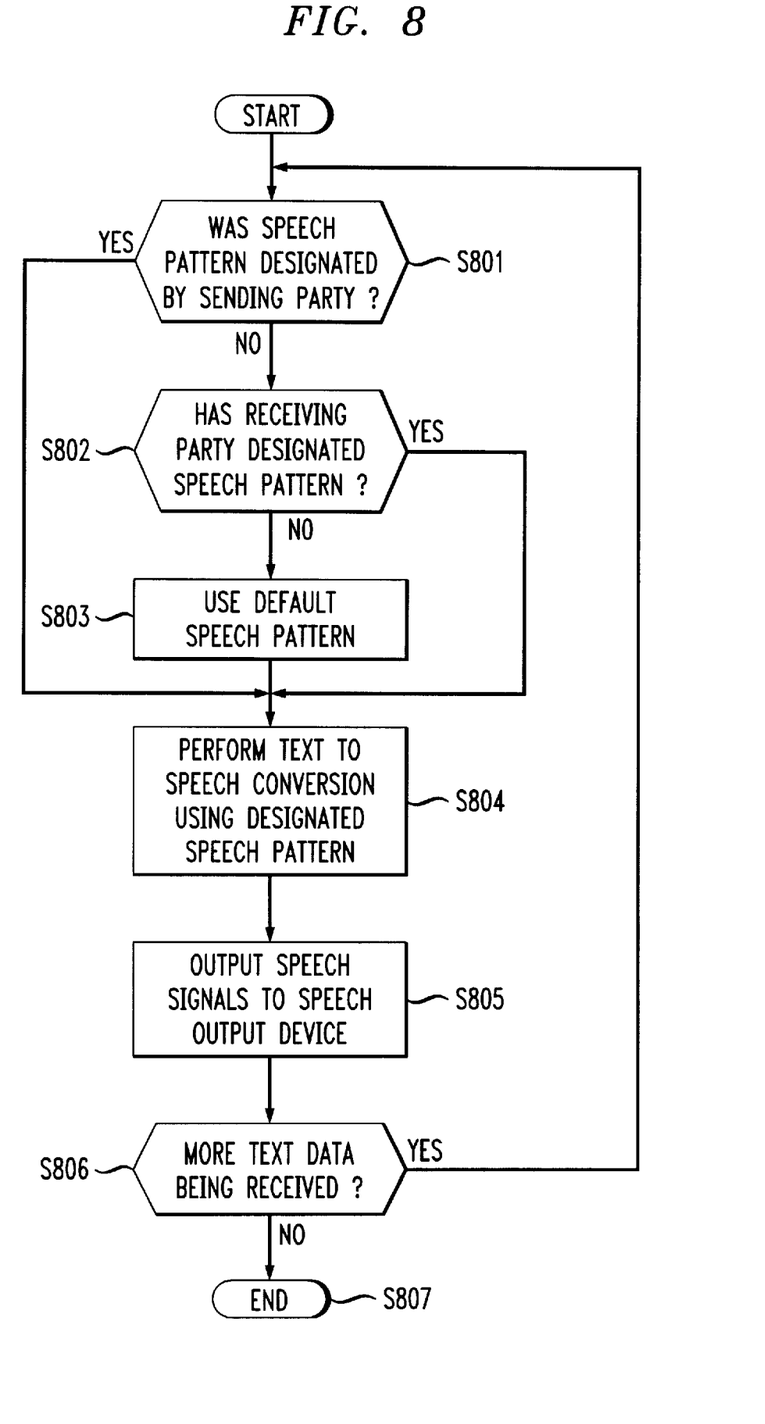
FIG. 8 is a flowchart of the operation of the text to speech conversion device of FIG. 2.

FIG. 8 is a flowchart of the operation of the text to speech conversion device 206. When text data is received and stored in the incoming text buffer 209, the terminal controller 202 routes the text data to the text to speech conversion device 206, if the text to speech function is enabled by the user. Then, in step S801, the text to speech controller 402 of the text to speech conversion device 206, determines if the speech pattern to be used has been designated by the sending party. This may be determined by analyzing the signal to determine if a header signal identifying the speech pattern is present. If the sending party has designated the speech pattern, control jumps to step S804; otherwise, control continues to step S802.

In step S802, the text to speech controller 402 determines if the receiving party has designated the speech pattern to be used through the user interface 204. If the receiving 10 party has designated the speech pattern, control jumps to step S804; otherwise, control continues to step S803 where a default speech pattern is used.

In step S804, the text to speech controller 402 causes the text to speech conversion to be performed by the text to speech converter 407 using the designated speech pattern. Next, in step S805, the text to speech controller 402 outputs the output speech signals, generated by the text to speech converter 407 in step S804, to the speech output device 211. Then, in step S806, the text to speech controller 402 determines if there is more text data that needs to be converted into speech. If there is, then control returns to step S801; otherwise, control goes to step S807 and ends.

Figure 9:
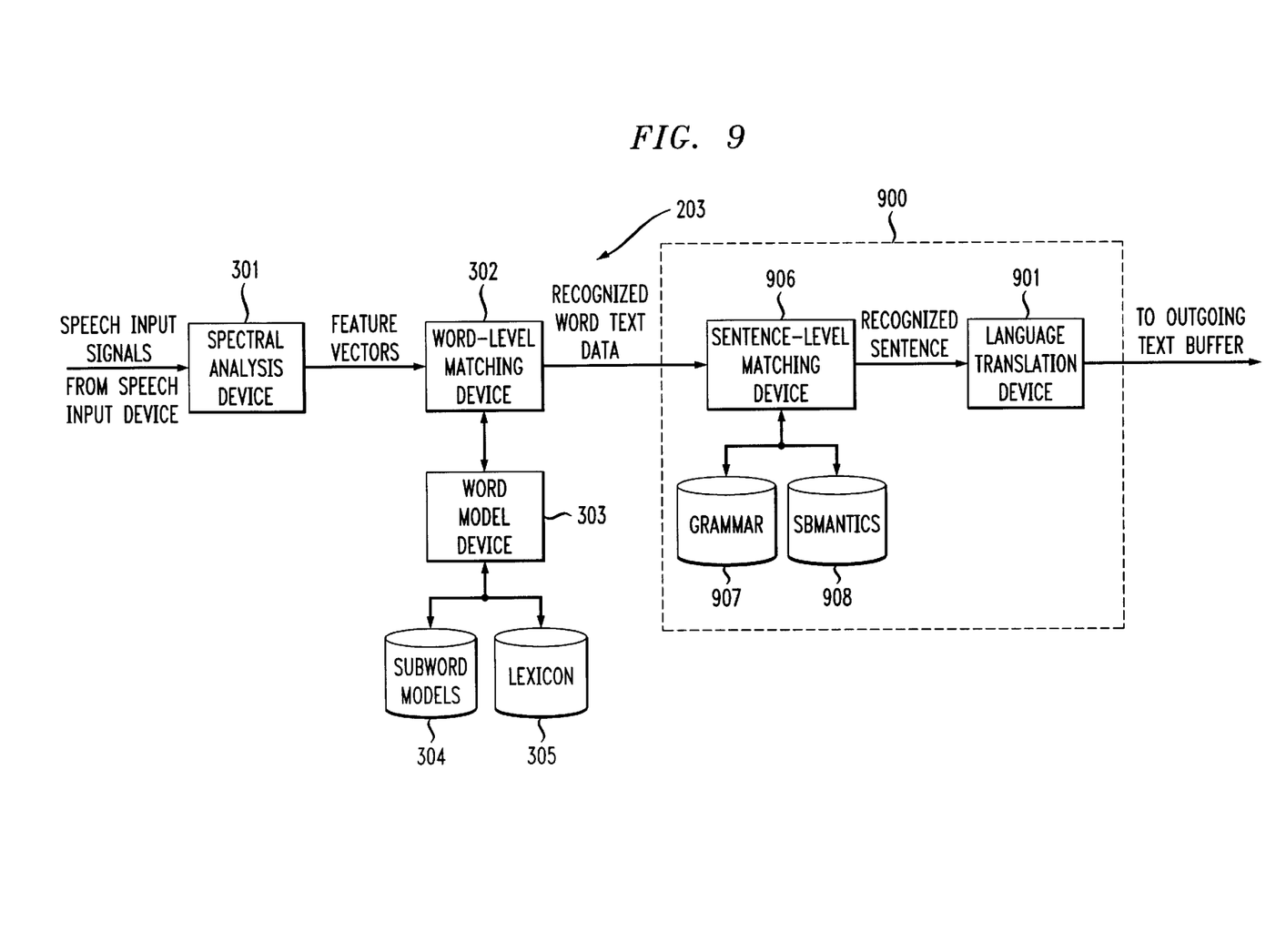
FIG. 9 is a block diagram of the speech recognition device with an additional language translation device.

FIG. 9 shows a third embodiment in which the speech recognition device 203 outputs text data in a selected language. In this embodiment, the speech recognition device 203 further receives commands through the user interface 204 indicating the selected language. The speech recognition device 203 further includes a language translator 900.

The language translator 900 may be a single device that translates text data in one language to text data in multiple other selected languages or may be separate devices that translate text data between two selected languages (for example, English and Japanese).

In this embodiment, the speech recognition device 203 serves to convert the speech input signals into text data of the particular language of the speaker, as described above with reference to the first embodiment, and then further translates the text data into text data of the selected language. After the speech input signals are converted into recognized word text data, the recognized word text data is input to the language translator 900. The language translator 900 performs language translation by sending the recognized word text data in the sending party's language to a sentence-level matching device 906 that determines the proper output text data sentence structure for the identified words from the word-level matching device 302. The sentence-level matching device 906 retrieves information from the grammar database 907 and semantics database 908 relating to the rules of sentence structure and the meaning of the identified words in order to place the text data in the proper order. The text data is then output to the language translation device 901 which translates the recognized sentences into the language of the receiving party. Such language translation devices are generally known in the art and are described, for example, in U.S. Pat. No. 5,497,319 to Chong et al., U.S. Pat. No. 5,640,575 to Maruyama et al. and U.S. Pat. No. 5,477,450 to Takeda et al., the disclosures of which are hereby incorporated by reference.

In a fourth embodiment, the speech recognition device 203 shown in FIG. 3 converts the speech input signals into textual representations of the speech signals. In this embodiment, the textual representation is not the actual words that are part of the speech input signals but is rather a textual code representing the phonemes detected in the speech input signals.

In this embodiment, the phonemes detected from the feature vectors are identified using the word model device 303. The word model device 303 includes a listing of phonemes and corresponding textual code representations of these phonemes. These textual code representations are then output to the outgoing text buffer 207.

The textual code representations are then transmitted to the receiving subscriber terminal 110 in the manner set forth above. The receiving subscriber terminal 110 would further include in the text to speech conversion device 206 a phonemes database (not shown) for converting the textual code representations into the spoken phonemes. Thus, rather than having to determine the actual words in the speech input, only the phonemes are detected and sent as text data.

As shown in FIG. 1, the method of this invention is preferably implemented on a programmed general purpose computer. However, the speech to text and text to speech conversions and transmission can also be implemented on a special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 5–8 can be used to implement the speech to text and text to speech conversions and transmission of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of providing communication between a first party using a first communication device and a second party using a second communication device over a network, comprising:

generating a first textual representation by the first party using the first communication device;

sending the first textual representation over the network to the second communication device;

selecting a first speech pattern by the second party for converting the first textual representation into first speech output signals; and converting the first textual representation into first speech output signals using the first selected speech pattern.

2. The method of claim 1, wherein the first selected speech pattern is selected from a plurality of speech patterns of different types of speakers stored in the second communication device.

3. The method of claim 1, wherein generating the first textual representation includes:

receiving, in the first communication device, first speech input from the first party; and converting the first speech input into the first textual representation.

4. The method of claim 3, further comprising:

receiving, by the first party, a second textual representation sent from the second party over the network; and converting the second textual representation into second speech output signals.

5. The method of claim 4, wherein communication between the first party and the second party is substantially continuous realtime communication.

6. The method of claim 4, further comprising storing at least one of the first textual representation and the second textual representation in a storage device for subsequent retrieval.

7. The method of claim 4, wherein the step of converting the second textual representation includes determining a second speech pattern to use for outputting the second speech output signals.

8. The method of claim 3, wherein the step of converting the first speech input signals includes determining phonemes included in the first speech input signals and converting the phonemes into at least one of textual words and textual codes.

9. The method of claim 3, wherein the step of converting the first speech input signals includes determining textual words included in the first speech input signals and arranging the textual words into textual sentences using grammar and semantic information for a first language.

10. The method of claim 9, wherein the step of converting the first speech input signals further includes translating the textual words of the first language into textual words of a second language.

11. The method of claim 9, wherein communication between the first party and the second part is substantially continuous realtime communication.

12. The method of claim 1, wherein selecting a speech pattern further comprises, prior to the first speech pattern being selected by the second party, determining if another speech pattern has been designated by the first party, and if the first party has not designated another speech pattern, then selecting the first speech pattern selected by the second party.

13. A communication apparatus that provides communication between a first party and a second party over a network, comprising:

an incoming text buffer that receives a first textual representation from the first party over the network;

a text-to-speech conversion device that converts the first textual representation into first speech output signals, wherein the text-to-speech conversion device uses a first speech pattern for outputting the first speech output signals, and wherein the first speech pattern is selected by the second party; and a speech output device that outputs the first speech output signals.

14. The communication apparatus of claim 13, wherein the first speech pattern is selected from a plurality of speech patterns stored in the communication apparatus.

15. The communication apparatus of claim 13, further comprising:

a speech input device that receives speech input from the second party and converts the speech input into speech input signals;

a speech-to-text device that converts the speech input signals into a second textual representation of the speech input signals; and a communications interface that sends the second textual representation over the network to the first party.

16. The communication apparatus of claim 15, further comprising a storage device for storing at least one of the first textual representation and the second textual representation for subsequent retrieval.

17. The communication apparatus of claim 15, wherein the communication apparatus provides substantially continuous realtime communication between the first party and the second party.

18. The communication apparatus of claim 15, wherein the speech-to-text device determines phonemes included in the speech input signals and converts the phonemes into at least one of textual words and textual codes.

19. The communication apparatus of claim 15, wherein the speech-to-text device determines the textual words included in the speech input signals and arranges the textual words into textual sentences using grammar and semantic information for a first language.

20. The communication apparatus of claim 19, wherein the speech-to-text device translates the textual words of the first language into textual words of a second language.

* * * * *